United States Patent [19]

Willoughby et al.

[11] 4,243,111

[45] Jan. 6, 1981

[54] AUTOMATIC SHUT-OFF VALVE FOR POWER TOOLS

[75] Inventors: Robert A. Willoughby; Renno W. Budziak, both of Athens, Pa.

[73] Assignee: Ingersoll-Rand Company, Woodcliff Lake, N.J.

[21] Appl. No.: 7,905

[22] Filed: Jan. 31, 1979

[51] Int. Cl.³ .......................... B23B 45/04; B27C 3/08

[52] U.S. Cl. .......................................... 173/169; 91/59; 173/12

[58] Field of Search .................... 173/169, 12, 18, 161; 91/59, 445

[56] References Cited

U.S. PATENT DOCUMENTS

| | | | |
|---|---|---|---|
| 2,814,277 | 11/1957 | Jimerson | 173/169 X |
| 3,493,056 | 2/1970 | Boeger et al. | 91/59 X |
| 3,608,647 | 9/1971 | Borries | 91/59 X |
| 3,656,560 | 4/1972 | Catterfeld et al. | 91/59 X |
| 3,667,345 | 6/1972 | Schaedler et al. | 91/59 |
| 3,696,834 | 10/1972 | Vonhoff | 173/169 X |
| 3,920,088 | 11/1975 | Dudek | 173/169 |
| 4,023,627 | 5/1977 | Madison et al. | 173/12 |
| 4,106,750 | 8/1978 | Karden et al. | 173/169 X |

*Primary Examiner*—Ronald Feldbaum
*Attorney, Agent, or Firm*—Walter C. Vliet

[57] ABSTRACT

A fluid-actuated shut-off valve for a fluid-powered tool such as a wrench including a spool valve urged to open position by a spring and having respective valve-operating surfaces subject to both regulated inlet and exhaust pressures in the tool. The valve operating surfaces and spring are arranged so the valve is thrown to its closed position by a combination of a constant regulated control pressure and the drop in exhaust pressure as the tool motor slows down and stalls under load.

5 Claims, 2 Drawing Figures

AUTOMATIC SHUT-OFF VALVE FOR POWER TOOLS

BACKGROUND OF THE INVENTION

This invention relates to power tools and more particularly to a fluid-actuated shut-off valve for a fluid-powered tool such as a wrench.

U.S. Pat. No. 3,656,560, issued Apr. 18, 1972, to R. J. Catterfeld, et al, discloses a prior art fluid-actuated shut-off valve for a fluid-powered tool. The prior art tool worked well for any given inlet pressure. However, wide variations in inlet pressure could not be tolerated without tool adjustment.

SUMMARY OF THE INVENTION

A principal object of this invention is to provide a novel fluid-actuated valve mechanism of the foregoing type which substantially eliminates or minimizes the disadvantages of the prior art.

Other important objects of this invention are: to provide a novel shut-off valve actuated by fluid and responsive to the torque load on a tool; to provide a shut-off valve that operates without a restriction in the fluid inlet passage of the tool; and to provide a tool shut-off valve of a simplified and economical construction which incorporates a means for regulating control pressure so as to afford a wider range of acceptable inlet pressure and, therefore, torque output variance without tool adjustment and while retaining reliable shutoff upon achieving stall torque.

In general, the foregoing objects are attained in a tool construction including a fluid motor, a fluid inlet passageway and a fluid exhaust passageway, a fluid-operated valve located in the inlet passageway and movable between alternate positions including an open position allowing motive fluid to flow to the motor and a closed position preventing motive fluid from flowing to the motor, spring means urging the valve to its open position, first valve-operating means subject to a regulated pressure and time rise rate of pressure and urging the valve to its closed position, second valve-operating means subject to pressure in the exhaust passageway and urging the valve to its open position with the spring means, the first and second valve-operating means being arranged so that the valve will move to its closed position in response to the drop in fluid pressure in the exhaust passageway when the motor slows down and stalls under a load.

BRIEF DESCRIPTION OF THE DRAWINGS

The invention is described in connection with the accompanying drawing wherein.

DESCRIPTION OF THE PREFERRED EMBODIMENT

Figure 1:
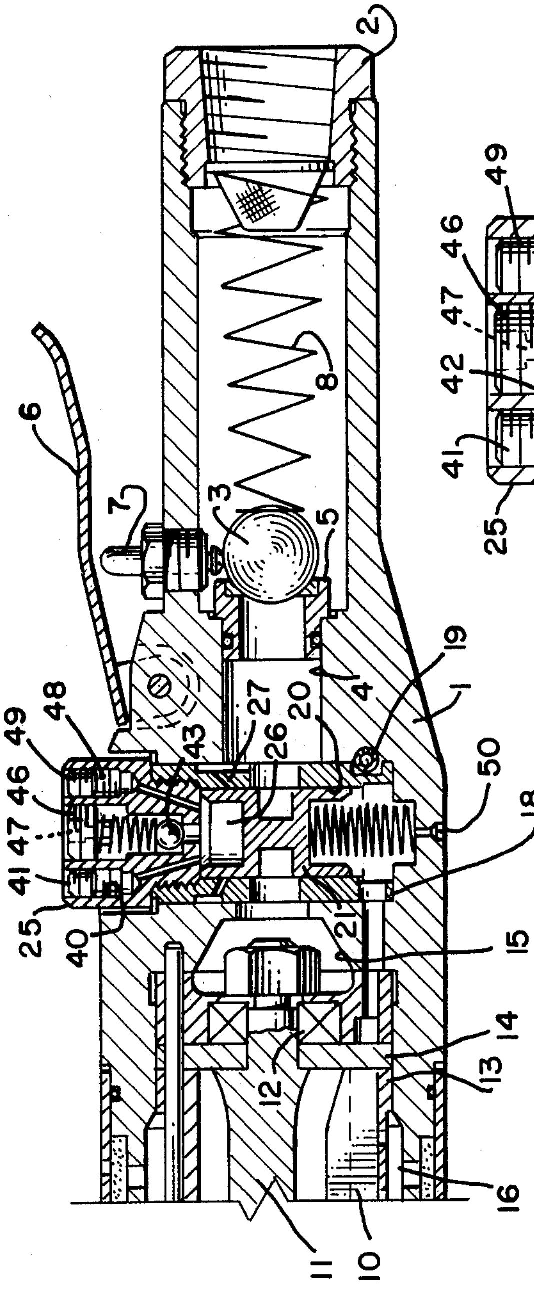
FIG. 1 is an elevational view with portions shown in section of a power tool containing the shut-off valve of this invention and showing the valve in its open position.

FIG. 1 shows the rear portion of a power wrench casing 1. The casing 1 includes a hose fitting 2 at its rear end adapted to connect to an air hose (not shown) and opening into a supply or inlet passageway 4. The inlet passageway 4 contains a conventional lever-type throttle valve 5 operated by a throttle lever 6 engaging a plunger 7 which in turn engages a ball seal 3. The throttle valve 5 is urged shut by a spring 8.

The casing 1 contains a conventional vane-type rotary motor 10 including a rotor 11 mounted in a rear bearing 12 and rotating in a fixed cylinder 13. The rotor 11 also engages a rear end plate 14. The motor includes an inlet 15 connected to the inlet passageway 4 and an exhaust passageway 16.

A novel shut-off valve mechanism is mounted in the casing 1 in the inlet passageway 4 intermediate the throttle valve 5 and the motor 10. This valve mechanism includes a closed-end housing or sleeve 18 mounted in a corresponding opening provided in the casing 1 and extending across the inlet passageway 4. The valve sleeve 18 is locked in place in the casing 1 by a roll pin 19. The sleeve 18 contains a cylindrical bore 20 slidably containing a spool valve 21 and having respective inlet and outlet ports 22 and 23 communicating with the passageway 4.

Figure 2:
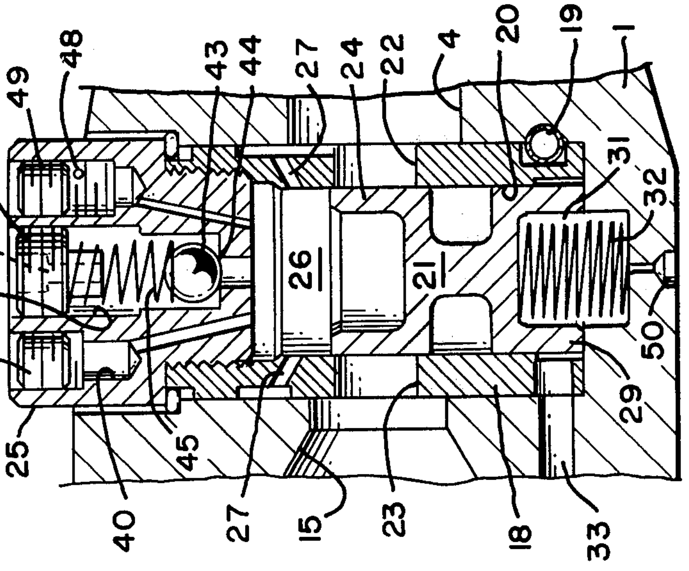
FIG. 2 is a fragmentary view of FIG. 1 showing the valve spool in elevation and in the closed position.

The spool valve 21 is shaped and arranged so that it opens the passageway 4 when in the left position as shown in FIG. 1 and blocks the passageway 4 when in the right position shown in FIG. 2. The left end 24 of the valve 21 contains a cavity which cooperates with the top end 25 of the valve sleeve 18 to form a chamber 26. A short passage 27 extends from the passageway 4 on the supply side of the valve 21 to a port opening into the cylindrical bore 20 a short distance from the sleeve end 25 where it is covered by the valve 21 in its open position as shown in FIG. 1. A clearance is provided between the valve 21 and the cylindrical bore 20 sufficient for fluid pressure to flow into the chamber 26 from the inlet passageway 4 in a restricted manner. Fluid pressure in the chamber 26 urges the valve 21 towards its closed position.

The sleeve end 25 is provided with three passageways leading to atmosphere. The signal port 40 is shown with a seal cap 41 in the preferred embodiment. The seal cap 41 may be removed, and the signal port utilized to measure pressure for any purpose desired; for example, controlled pressure check or operation of a bolt marking device. A pressure regulating device is installed in pressure regulating passageway 42. The pressure regulating means provided in the passageway consists of a ball regulator 43 which is held against a regulator valve seat 44 by means of a spring 45, and adjustable end cap 46 which is threadingly engaged in pressure regulating passageway 42. The adjustable end cap is provided with a vent hole 47 to allow the pressure fluid bypassing valve seat 44 to escape to atmosphere. Adjustable vent passageway 48 is also provided in the sleeve end 25, and flow through the adjustable passageway is controlled by means of a threaded meter valve 49.

It may be appreciated by one skilled in the art, therefore, that the pressure in chamber 26 may be controlled by the spring force setting on ball regulator 43. A higher pressure in chamber 26 may be obtained by rotating adjustable end cap 46 to further compress spring 45. A lower pressure in chamber 26 may be obtained by screwing adjustable end cap 46 out so as to relieve the spring force on ball regulator 43. In general, the function of the pressure regulating device is to limit the maximum obtainable pressure in chamber 26.

For the shut-off valve to function properly, it should be understood that the rate of rise of pressure in chamber 26 must also be controlled. Manufacturing tolerances without greater expense do not allow for the degree of control of radial clearance between the spool valve 21 and its bore 20 to adequately control the rate of pressure rise over a wide range of inlet pressures. The adjustable vent passageway 48 has been provided in the present novel combination to accommodate the valve so as to control the pressure rate of rise in chamber 26. This is an especially important consideration in the prevention of premature shut-off which can occur during starting of the motor and until the time the motor has achieved running speed. If the pressure is allowed to build up in chamber 26 too rapidly, the balancing force in chamber 31 may be insufficient to prevent the spool valve 21 from shifting to its closed position. The pressure in chamber 31 is dependent on the exhaust pressure which is "0" at the start of the tool, but builds up quite rapidly as the tool accelerates.

The bottom end 29 of the valve 21 contains a cavity which cooperates with the casing 1 to form a chamber 31, and a spring 32 is disposed in the chamber 31 between the casing and the valve 21 to urge the valve 21 toward its open position. A conduit 33 interconnects the chamber 31 with the exhaust passageway 16 whereby fluid pressure from the exhaust in the chamber 31 urges the valve 21 toward its open position.

OPERATION

In describing the operation of the shut-off valve, we assume that, at the start, the throttle valve is closed, air pressure is in the supply hose 3, the shut-off valve 21 is in its open position as shown in FIG. 1 and the motor 11 is not operating.

The opening of the throttle valve 5 will allow air pressure to quickly start the motor 11. We will assume that the tool is a power wrench, such as an angle wrench, driving a nut as the motor starts. The pressure will rise in the exhaust passageway 16 and in the chamber 31 to urge the valve 21 toward the open position. Also, pressure will flow into the chamber 26 from the inlet passageway 4 through the clearance provided to urge the valve 21 toward its closed position. As previously explained, the function of the pressure regulating device and the adjustable vent serve to control the maximum pressure in chamber 26 and its rate of rise. By controlling the maximum pressure achieved in chamber 26 by means of the ball regulator 43, wider ranges of inlet pressure may be tolerated by the shut-off valve mechanism. The exhaust pressure at shut-off is relatively unaffected by the inlet pressure for a normal air motor. By venting a portion of the air reaching chamber 26 through adjustable vent passage 48, it may be appreciated that the rate of rise of pressure may thereby be controlled. A slower rate of rise is achieved by venting a greater portion of the pressure fluid through meter valve 49. Utilizing the novel combination of the pressure regulation and chamber venting, it is possible to have a reliable shut-off over a wide range of inlet pressure adjustment. The problem of premature shut-off may be eliminated by this combination without undue tolerances control between the valve 21 and its bore 20. While the motor operates, the pressure in the inlet passageway 4 is substantially less than supply pressure due to the motor 11 using a large volume of air. Also, the exhaust pressure in the exhaust passageway 16 is relatively high due to the flow of large air volumes through the motor 11.

As the nut driven by the wrench is tightened, the torque load on the motor rises and eventually the motor stalls. As the motor slows down and comes to a stop, its consumption of air is reduced. The air pressure in the valve operating chamber 26 remains relatively constant by the pressure regulator. Also, as the air flow through the motor is reduced, the exhaust pressure in the valve-operating chamber 31 is reduced.

Eventually, the differential forces on the valve spool 21 are shifted to move the valve toward its closed position. As the valve 21 approaches its closed position, as shown in FIG. 2, it uncovers the short passage 27 to allow the air to flow freely from the inlet passageway 4 into the chamber 26. This overcomes the ability of the pressure regulator to regulate the pressure in chamber 26, and there is a rapid pressure rise which assists the valve 21 to its closed position.

The valve 21 will remain in its closed position as shown in FIG. 2, stopping the motor 11 so long as the throttle valve 5 remains open. When the throttle valve 5 is returned to its closed position, the pressure in the chamber 26 rapidly leaks away due to leakage past the adjustable vent passage 48. As the pressure in the chamber 26 falls, the valve 21 is returned to its open position by its spring 32 where it is ready for another operating cycle.

It has also been found that the response time of the shut-off valve may be significantly improved by providing a vent 50 for chamber 31. This vent prevents a cushion of air from being trapped by spool valve 21 as it moves towards the closed position by the differential pressure at shut-off.

While only a single embodiment of the invention is illustrated and described in detail, this invention is not limited merely to this embodiment, but contemplates other embodiments and variations which utilize the concepts and teachings of this invention.

We claim:

1. A fluid-driven power tool including:

a casing containing a motor, an inlet passageway for feeding motive fluid to said motor and an exhaust passageway for exhausting fluid from said motor;

a fluid-actuated valve located in said inlet passageway and movable between alternate positions including an open position allowing motive fluid to flow to said motor and a closed position preventing motive fluid from flowing to said motor;

first valve-operating means including means for establishing relatively constant pressure and means for adjustably controlling the rate of pressure rise urging said valve to its closed position;

second valve-operating means communicating with said exhaust passageway and operative, when subject to fluid pressure, to urge said valve to its open position against the force of said first valve-operating means; and said first and second valve-operating means being arranged so that said valve will move to its closed position in response to the drop in fluid pressure in said exhaust passageway when said motor slows down.

2. The fluid-driven power tool of claim 1 wherein:

said means for establishing a relatively constant pressure in said first valve operating means comprises an adjustable spring pressure regulator.

3. The fluid-driven power tool of claim 2 wherein:

said pressure regulator comprises a spring loaded ball and cooperating annular seat.

4. The fluid-driven power tool of claim 1 wherein:

said means for controlling the rate of pressure rise further comprises an adjustable vent.

5. The fluid-driven power tool of claim 1 wherein:

a pressure fluid vent is provided on the second valve operating means of said fluid actuated valve to improve its response time to a closed position.

* * * * *